June 5, 1956      S. G. ESKIN      2,749,043
THERMOSTAT AND OVER-TEMPERATURE GAS SHUT-OFF VALVE
Filed Aug. 3, 1953
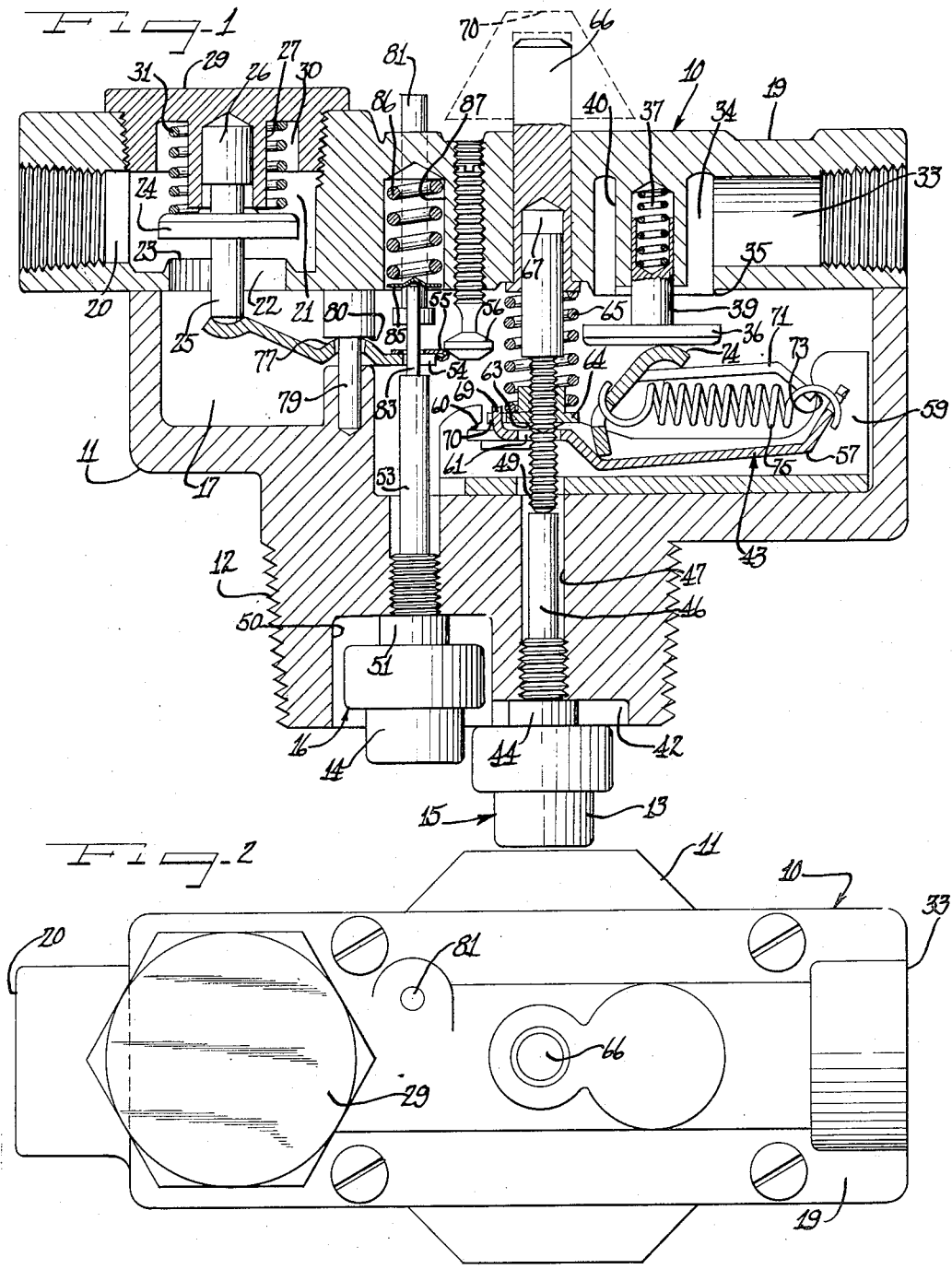
Inventor
Samuel G. Eskin

United States Patent Office 2,749,043
Patented June 5, 1956

2,749,043

THERMOSTAT AND OVER-TEMPERATURE GAS SHUT-OFF VALVE

Samuel G. Eskin, Chicago, Ill., assignor to The Dole Valve Company, Chicago, Ill., a corporation of Illinois Application August 3, 1953, Serial No. 371,874

7 Claims. (Cl. 236—21)

This invention relates to safety devices for gas heating units and more particularly relates to a novel and improved thermostat and over-temperature shut-off safety valve.

A principal object of my invention is to provide a new and effective safety device for gas burners arranged to act as a thermostat and shut off the flow of gas at the temperature for which the device is set and to shut off the flow of gas upon the over-temperature conditions.

Another object of my invention is to provide a simple and novel form of safety gas valve controlling the flow of gas to a main burner, which utilizes individual positively acting thermostatic means to shut off the flow of gas to the main burner upon predetermined temperature conditions, and to shut off the flow of gas upon over-temperature conditions.

A further object of my invention is to provide an effective thermostat and over-temperature safety device particularly adapted for gas hot water heaters in which individual power type thermostatic elements shut off the flow of gas at the temperature for which the thermostatic element is set and for over-temperature conditions, where the one thermostatic element may fail to operate.

A further object of my invention is to provide a simple and improved form of gas valve for hot water heaters, controlling the supply of gas to a main gas burner, in which individual thermostats and valves are provided, one serving as a thermostatically operated valve, shutting off the supply of gas for predetermined temperature setting, and the other acting as a safety device shutting off the supply of gas upon over-temperature conditions.

A still further object of my invention is to provide a novel and improved form of gas valve utilizing two series valves in a single valve body to control the supply of gas to the gas burner of a hot water heater, one being normally biased in a closed position, with individual thermostatic elements carried on the outside of the valve body, for operating each of said valves, the thermostatic element closing the valve normally biased into an open position being adjustable in accordance with predetermined desired temperature conditions and the thermostat releasing the valve normally biased into a closed position shutting off the supply of gas upon over-temperature conditions.

A still further object of my invention is to provide a new and improved form of safety gas valve for hot water heaters, shutting off the main gas burner when the temperature of the hot water reaches a predetermined temperature and upon over-temperature of the hot water, wherein a central boss extending from the valve body is adapted to be threaded within the tank of a hot water heater, and the casings of thermostatic elements are carried by said boss, for immersion in the water being heated and have operating pistons extensible within the valve body for controlling operation of the valve.

These and other objects of my invention will appear from time to time as the following specification proceeds and with reference to the accompanying drawing wherein:

Figure 1 is a longitudinal sectional view taken through a valve constructed in accordance with my invention; and Figure 2 is a top plan view of the valve shown in Figure 1.

In the embodiment of my invention illustrated in the drawing, I have shown a two part valve body 10 comprising a casing part 11 having an enlarged diameter generally frusto-conical threaded boss 12 extending therefrom and adapted to be threaded within the wall of the hot water heater, to immerse stationary casing parts 13 and 14 of thermostatic elements 15 and 16 in the medium being heated.

The casing part 11 has a hollow chamber 17, opening to one side thereof and closed by a valve part 19, suitably secured thereto. The valve part 19 is shown as having a gas inlet 20 leading to a valve chamber 21. The valve chamber 21 opens to the chamber 17 through a port 22 having an annular valve seat 23 within the chamber 21 and facing a valve 24, to be closed thereby.

The valve 24 is shown as being a well known form of disk type of valve engageable with the valve seat 23 on its face, and having a valve stem 25 extending from opposite sides thereof. One end of the valve stem 25 is shown as having an enlarged diameter end portion 26, slidably guided within an annular wall 27 extending inwardly from a threaded closure plug 29, closing the valve chamber 21. The closure plug 29 is shown as being threaded within the valve body part 19, and as having an inner annular recess 30 encircling the annular wall 27, within which is seated a compression spring 31, engaging the opposite face of the valve disk 24 from the seat 23, and biasing said valve into engagement with the seat 23.

The opposite end of the valve body part 19 from the inlet 20 and valve 24 is shown as having an outlet 33 leading therefrom in communication with an annular passageway or chamber 34. The passageway or chamber 34 has a valve seat 35 within the chamber 17 of the casing part 11. The seat 35 is adapted to be engaged by a valve 36, herein shown as being a well known form of disk type of valve biased into an open position by compression spring 37. As herein shown the valve disk 36 is shown as having a valve stem 39 leading therefrom and slidably guided within an annular wall 40, defining the inner margin of the annular chamber or passageway 34. The stem 39 is shown as being hollow for a portion of its length, to receive one end of the spring 37.

The valve 36 is shown as being a thermostatically operated valve closed by an over center snap acting valve closing device 43, under the control of the thermostatic element 15, for shutting off the flow of gas to the main gas burner when the medium being heated, such as water, reaches a predetermined desired temperature. The valve 24 on the other hand serves as an over-temperature shut-off valve released by the thermostatic element 16 set to operate when the water reaches a higher temperature than the setting of the thermostatic element 15, as when the valve 36 may fail to close.

The thermostatic elements 15 and 16 are shown as being of the so-called power element types of thermostatic elements, such as are shown and described in the Vernet Patent No. 2,128,274 dated August 30, 1938, and frequently referred to as "Vernay" thermostatic elements. The present power types of thermostatic elements have been selected for the extreme power of the element in comparison with the other types of thermostatic elements, and the relatively long range of travel of the pistons thereof, which is many times greater with far more power than other thermostatic elements. The elements used therefore provide positive release and action for the valves, for the settings of the individual thermostats. In the "Vernay" types of thermostatic element, a thermally deformable meduim (not shown) is carried in the casing of the element, and acts against a membrane or deformable member (not shown), to extend a plunger or piston from a reduced diameter cylinder in communication with the casing of the element.

As herein shown, the thermostatic element 15 has a reduced diameter cylinder 44 extending from the casing 13 thereof and recessed within a recess 42 on the outer face of the boss 12, and threaded within said boss. A piston or plunger 46 is shown as being extensible from the cylinder 44, and movable along a passageway 47 extending along the boss 12 and opening into the chamber 17. The free end of the piston 46 is shown as having engagement with the aligned inner end of a threaded reaction plunger 49, operable to release the over center snap acting device 43 to close the valve 36, when the hot water reaches the temperature for which the thermostatic element 15 is set.

The thermostatic element 16 is shown as being partially recessed within a recess 50 formed in the outer face of the boss 12 and intersecting the recess 42. A cylinder 51 extending from the casing 14 of the thermostatic element 16 is shown as being threaded within said boss. A piston or plunger 53 of the thermostatic element 16 is extensibly mounted within the cylinder 51, for engagement with one end of the lever arm 54, to release a detent spring 55 on the inner end of the lever 54, from a detent head 56, and release the valve 24 to be closed by the bias of the spring 31, as will hereinafter more clearly appear as this specification proceeds.

The snap acting over-center closure device 43 for the valve 36 is shown as being of the same general type of snap acting closure device as is shown and described in Patent No. 2,189,882 granted to Joseph A. Cerney on February 13, 1940, so only described in sufficient detail to make my present invention readily understandable. The snap acting closure device 43, includes generally an actuating lever 57 extending along a support member 59, and having pivotal bearing engagement with said support member at one end thereof, to pivot in a counterclockwise direction when released by the release plunger 49. The actuating lever 57 has a bifurcated inner end portion extending along opposite sides of the plunger 49 and in advance thereof, having pivotal bearing engagement with spaced recesses 60 on the inner end of the support member 59. The lever 57 is also apertured as indicated by reference character 61, to accommodate the plunger 49 to pass therethrough. Knife edges 63, 63 on an adjustable abutment collar 64 threaded on the plunger 49 are biased into engagement with the lever 57 by a compression spring 65 to retain the actuating lever 57 in the position shown in Figure 1. The spring 65 is interposed between the collar 64 and the flanged inner end portion of an adjusting pin 66, which retracts the piston 46 within the cylinder 44.

The adjusting pin 66 is shown as having a hollow inner end portion 67 slidably receiving the outer end of the plunger 49, and may be feather keyed to said plunger to effect rotation of said plunger upon turning of said pin, to adjust the position of the collar 64 along said plunger and the temperature at which the thermostatic element 15 operates to release the snap acting over-center closure device 43 to effect closing of the valve 36 with a snap action. As herein shown an ear 69 extends upwardly from the lever 57 into engagement with a slot formed in the collar 64, to hold said collar from rotation, upon rotation of the adjusting pin 66. If desired a hand knob 70 may be provided on the end of the pin 66, to turn the same and change the adjustment of the thermostat 15.

A valve operating lever 71 is shown as having pivotal bearing engagement with the opposite end of the support frame 59 from the recesses 60 at 73. A valve operating abutment or cam 74 extends from the lever 71 for engagement with the valve 36, to close the same. A spring 75 is connected between the outer end portion of the operating lever 57 and the valve operating lever 71 and biases the operating lever 57 to turn about the fulcrum recesses 60 in a counterclockwise direction against the counter holding reaction of the knife edges 63.

Assuming the parts are in the position shown in Figure 1 and the valve 36 is open to accommodate the gas to flow to the burner, when the temperature of the water rises to the degree determined by the setting of the thermostatic element 15, the collar 64 and knife edges 63 will move away from the actuating lever 57. The spring 75 will then bias the actuating lever 57 to follow knife edges 63 and pivot in a counterclockwise direction about its pivot at 60. Continued counterclockwise movement of the lever 57 will carry the center line of the spring 75 over center and move the valve operating lever 71 by snap action to close the valve 36. As the temperature of the water falls, the spring 65 will retract the piston 46 within the cylinder 44 and the knife edges 63, engaging the actuating lever 57 will move said actuating lever to the right, accommodating the valve 36 to open.

The mechanism for opening the over-temperature valve 24 and holding said valve open, and releasing said valve to close, includes the lever 54. The end of the lever 54 opposite from the detent spring 55 is cupped and the cupped portion thereof has bearing engagement with the end of the valve stem 25. The lever 54 also has a convex intermediate portion 77, apertured to accommodate a pin 79 to pass therethrough. The convex portion 77 forms a fulcrum for said lever and is shown as pivoting about a shoulder 80 on the pin 79.

The valve 24 is opened by pressing on the outer end of a reset pin 81 slidably mounted in the valve body portion 19 to engage the inner end of said reset pin with the opposite end of the lever 54 from the valve stem 25. Pressure on the reset pin 81 will move the detent spring 55 past the detent head 56 from the side of said head facing the valve body portion 19 to the opposite side of said head and will move the lever 54 to the position shown in Figure 1, and open the valve, the detent spring 55 holding the valve open against the bias of the spring 31. Release of the detent spring 55 from the head 56, to release the valve to be closed is effected by extension of the plunger 53 into engagement with the lever 54, to move the detent spring 55 past the head 56 in a counterclockwise direction. The detent head 56 is shown as being threaded in the body portion 19 and as being accessible from the outside of said body portion as by a screw driver or like tool, to vary the position of said detent head with respect to the plunger 53 and thus vary the movement of said plunger required to release the detent spring 55 from said detent head to effect closing of the valve 24 by the spring 31 and thus to vary the temperature at which said thermostatic element operates to close the valve 24.

The plunger 53 is shown as having a reduced diameter portion 83 extending through a recessed portion of the lever 54 into engagement with a seating member 85, forming a seat for a compression spring 86. The spring 86 is shown as being seated within a drilled portion 87 of the valve body portion 19 to retractibly move the piston 53 upon a reduction in temperature of the hot water. The valve 24 may then be opened by operation of the reset pin 81, when the temperature of the water is sufficiently low to accommodate the retraction of the piston 53 within the cylinder 51.

The thermostatic element 16 and piston 53 thereof, besides releasing the valve 24 to close by its spring bias, when the temperature of the hot water approaches the boiling point, also prevents the valve 24 from being accidentally opened and held in an open position, as long as the over temperature conditions of the hot water prevail.

It will be understood that modifications and variations may be effected in the present invention without departing from the scope of the novel concepts thereof.

I claim as my invention:

1. In a thermostat and over temperature gas shut off valve, a valve body having a chamber therein, an inlet into said chamber, an outlet from said chamber, separate valves controlling the passage of gas from said inlet to said chamber and from said chamber to said outlet, separate thermostatic elements for operating said valves and each having a casing located on the outside of said valve body and containing a thermal responsive material, a cylinder extending from said casing and a piston extensible from said cylinder within said valve body upon predetermined rises in temperature, one thermostatic element being set to close one valve at a predetermined desired temperature setting, and the other thermostatic element being set to close the other valve at a higher temperature setting, both of said thermostatic elements being located for intimate association with the medium being heated and means individual to each thermostatic element for selectively adjusting the operating temperature thereof.

2. In a thermostat and over temperature gas shut off valve, a valve body having a valve chamber therein, an inlet into said chamber, an outlet from said chamber, separate valves controlling the passage of gas from said inlet to said chamber and from said chamber through said outlet, said valve body having a boss for threading within the wall of a hot water heater into contact with the water therein, two thermostatic elements threaded within said boss and contained within the extremities thereof, each having a casing on the outside of said boss and containing a thermal responsive material and positioned for intimate association with a medium being heated, and having a cylinder extending therefrom and a piston extensible within said valve body, for effecting the closing of an associated valve at the temperature for which said thermostatic element is set, one of said thermostatic elements being set for a predetermined desired water temperature, and the other of said thermostatic elements being set to operate at a higher temperature to shut off its associated valve as the temperature of the water approaches its boiling point, and means individual to each thermostatic element for selectively adjusting the temperature of operation thereof.

3. In a thermostat and over temperature gas shut off valve, a valve body having a chamber therein, an inlet into said chamber and an outlet therefrom, a valve controlling the inlet of gas into said chamber, spring means bising said valve into a closed position, a thermostatic valve controlling the discharge of gas from said chamber through said outlet, spring means biasing said valve in an open position, a thermostatic element carried by said valve body and having a casing on the outside of said valve body and a piston extensible therefrom within said valve body for effecting the closing of said second mentioned valve against its spring bias upon predetermined temperature rises of the hot water, and a second thermostatic element carried by said valve body and having a casing on the outside of said valve body and a piston extensible within said valve body for effecting the closing of said first mentioned valve upon predetermined over temperature conditions, the casings of each thermostatic element being located for intimate association with the medium being heated, and means individual to each thermostatic element for selectively adjusting the temperature of operation thereof.

4. In a thermostat and over temperature gas shut off valve, a valve body having a chamber therein, an inlet into said chamber and an outlet from said chamber, a valve controlling the inlet of gas into said chamber, spring means biasing said valve into a closed position, a lever moving said valve to an open position against the bias of said spring means, a reset pin operable from the outside of said casing to operate said lever to open the valve, detent means for holding said valve open, a thermostatic operated valve, controlling the discharge of gas from said chamber through said outlet, spring means biasing said valve in an open position, thermal responsive means for closing said valve against the bias of said spring means including an over center snap acting device having engagement with said valve, a thermostatic element having a casing on the outside of said valve body and a piston extensible therefrom within said valve body for releasing said snap acting device to close said valve upon predetermined temperature conditions, and means for releasing said detent means, to release said first-mentioned valve to close upon over temperature conditions comprising a thermostatic element including a casing on the outside of said valve body and having a piston extensible within said valve body into engagement with said lever means upon extension of said piston.

5. In a thermostat and over temperature gas shut off valve for hot water heaters, a valve body having a valve chamber therein, an inlet into said chamber, an outlet from said chamber, a valve controlling the inlet of gas into said chamber, a spring biasing said valve into a closed position, a thermostatic valve controlling the discharge of gas from said chamber, a spring biasing said valve into an open position, a threaded boss extending from said valve body for threading within the wall of a hot water heater, a thermostatic element threaded within said boss and having a casing on the outside of said boss within the peripheral margins thereof for immersion in the hot water, a cylinder extending from said casing and threaded within said boss and having a piston extensible therefrom along said boss into the interior of said valve body, an over center snap acting operating mechanism normally biased in position to accommodate said thermostatic valve to open and released by said piston upon the extensible movement thereof, to close said thermostatic valve upon predetermined temperature rises, and a second thermostatic element threaded within said boss and having a casing on the outside of said boss, a cylinder extending therefrom and threaded within said boss and a piston extensible therefrom, said piston releasing said first mentioned valve for closing by the spring bias thereof upon predetermined over temperature conditions.

6. In an over temperature gas shut off valve for hot water heaters, a valve body having a chamber therein, an inlet into said chamber, a valve controlling the passage of gas from said inlet to said chamber, a spring biasing said valve into a closed position, said valve having a valve stem extending within said chamber, a lever fulcrumed intermediate its ends and having engagement with said valve stem for opening the same against its spring bias, a reset pin operable from the outside of said valve body and having engagement with the opposite end of said lever from said valve stem for operating said lever to open said valve, detent means comprising a stationary detent head and a detent spring on said lever engageable with one side of said detent head for holding said lever in position to hold said valve open, and means releasing said detent means to effect closing of said valve by its spring bias and positioning said detent spring to engage the opposite side of said detent head to prevent accidental opening of the valve comprising a thermostatic element including a casing on the outside of said valve body containing thermal responsive material, a cylinder threaded in said body and a piston extensible from said cylinder for releasable engagement with said lever.

7. In an over temperature gas shut off valve for hot water heaters, a valve body having a chamber therein, an inlet into said chamber, a valve controlling the passage of gas from said inlet to said chamber, a spring biasing said valve into a closed position, said valve having a valve stem extending within said chamber, a lever fulcrumed intermediate its ends and having engagement with said valve stem for opening the same against its spring bias, a reset pin operable from the outside of said valve body and having engagement with the opposite end of said lever from said valve stem for operating said lever to open said valve, detent means comprising a stationary detent head and a detent spring on said valve engageable with one side of said detent head for holding said lever in position to hold said valve open, and means releasing said detent spring from said detent head to effect closing of said valve by its spring bias and to position said detent spring to engage the opposite side of said detent head and hold the valve closed comprising a thermostatic element including a casing on the outside of said valve body containing thermal responsive material, a cylinder threaded in said body and a piston extensible from said cylinder for releasable engagement with said lever, spring means for retractibly moving said piston, and means for adjusting the position of said detent head to vary the travel of said piston necessary to effect closing of said valve and the temperature of closing said valve.

References Cited in the file of this patent

UNITED STATES PATENTS

| | | |
|---|---|---|
| 1,325,896 | Long | Dec. 23, 1919 |
| 1,889,142 | Douglass | Nov. 29, 1932 |
| 2,004,597 | Birtch | June 11, 1935 |
| 2,305,068 | Douglass | Dec. 15, 1942 |
| 2,312,479 | Ray | Mar. 2, 1943 |
| 2,598,351 | Carter | May 27, 1952 |